Patented July 2, 1940

2,206,433

UNITED STATES PATENT OFFICE 2,206,433

ANTIOXIDANT

Waldo L. Semon, Silver Lake Village, Ohio, assignor to The B. F. Goodrich Company, New York, N. Y., a corporation of New York No Drawing. Original application November 2, 1934, Serial No. 751,263. Divided and this application June 19, 1937, Serial No. 149,204

12 Claims. (Cl. 260—809)

This invention relates to the art of rubber manufacture and has as its object to provide a new and extremely effective class of antioxidants, which, when added to rubber, will greatly retard its deterioration.

This new class of antioxidants may be designated as N-mono-aryl decahydronaphthylamines. The word aryl is here employed to designate aromatic hydrocarbon radicals having a single free valence on an aromatic nucleus, and the term mono-aryl is employed to designate compounds containing only an aryl radical substituted on the nitrogen of the amine and which are therefore secondary amines.

A specific example of one of these new antioxidants is phenyl decahydronaphthylamine (either alpha or beta), which may be obtained readily by catalytic reduction of phenyl naphthylamine (alpha or beta, as the case may be) until the naphthalene nucleus is fully saturated. A typical rubber composition may be prepared containing 100 parts by weight of rubber, 45 parts of carbon black, 2 parts of zinc oxide, 2 parts of stearic acid, 2 parts of pine tar, 3.25 parts of sulfur, 0.5 part of polybutylidene-aniline and 1.6 parts (1% of the composition) of the antioxidant, and vulcanized for 60 minutes at 295° C. to give an optimum cure. This composition resists deterioration and retains its strength and resiliency several times as long as the same composition without the antioxidant. Similar results may be obtained with the beta-naphthyl decahydronaphthylamine which can be obtained by the reduction of di-beta-naphthylamine, or indeed with any mono-aryl decahydronaphthylamine such as those derived from phenyl alpha-naphthylamine, o-tolyl beta-naphthylamine, m-tolyl beta-naphthylamine, p-tolyl beta-naphthylamine, p-cumyl beta-naphthylamine, alpha alpha dinaphthylamine, beta beta dinaphthylamine, alpha beta dinaphthylamine, etc., by suitable methods of reduction or otherwise.

It is a remarkable fact that although other mono-aryl alicyclic amines such as N-phenyl cyclohexylamine have little or no value as antioxidants, the decahydronaphthyl compounds of this invention are extremely active. They may be employed in any type of rubber composition, such as those used for automobile tires and tubes, hose, belting, sheet and thread rubber, rubberized fabrics, molded goods, seamless dipped goods, boots and shoes, etc., whether vulcanized in a mold, in open steam, in hot air, or even vulcanized in the cold by the so-called acid process. The proportion of antioxidants may vary from about 0.1% to 5%, although either smaller or greater proportions may be found useful, and they may be added to the rubber or other substance at any desired stage of the preparation of the product. If the material to which they are added is a liquid such as a rubber cement the antioxidants may simply be dissolved therein in small proportion, say 0.2% by weight. It is accordingly to be understood that the term "treating" is employed in the appended claims in a generic sense to embrace the incorporation of the antioxidants into a solid substance by milling or mastication, their addition to an aqueous dispersion such as rubber latex in a finely dispersed form, their solution in a liquid, and any equivalent methods such as applying them to the surface of vulcanized or unvulcanized rubber in the form of a powder, paste or solution. The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

This is a division of my copending application Serial No. 751,263 filed Nov. 2, 1934.

I claim:

1. The method of preserving rubber which comprises treating rubber with a secondary aryl decahydronaphthylamine.

2. The method of preserving rubber which comprises treating rubber with a secondary phenyl decahydronaphthylamine.

3. The method of preserving rubber which comprises treating rubber with phenyl alpha-decahydronaphthylamine.

4. The method of preserving rubber which comprises treating rubber with phenyl beta-decahydronaphthylamine.

5. The method of preserving rubber which comprises treating rubber with beta-naphthyl decahydronaphthylamine.

6. The method which comprises vulcanizing rubber comprising a secondary aryl decahydronaphthylamine.

7. A rubber composition containing a secondary aryl decahydronaphthylamine.

8. A rubber composition containing a secondary phenyl decahydronaphthylamine.

9. A rubber composition containing phenyl alpha-decahydronaphthylamine.

10. A rubber composition containing phenyl beta-decahydronaphthylamine.

11. A rubber composition containing beta-naphthyl decahydronaphthylamine.

12. A vulcanized rubber composition containing a secondard aryl decahydronaphthylamine.

WALDO L. SEMON.